United States Patent [19]
Kashul

[11] 3,872,606
[45] Mar. 25, 1975

[54] TURNTABLE FEEDER AND COOLER APPARATUS
[76] Inventor: George E. Kashul, 42 Felicity Dr., Scarborough, Ontario, Canada
[22] Filed: Nov. 26, 1973
[21] Appl. No.: 419,117

[52] U.S. Cl............................ 34/166, 34/168, 432/78, 432/80, 432/117
[51] Int. Cl............................................ F26b 17/12
[58] Field of Search............ 432/77, 78, 79, 80, 84, 432/106, 117; 34/64, 66, 168, 173

[56] References Cited
UNITED STATES PATENTS
| | | | |
|---|---|---|---|
| 2,799,489 | 7/1957 | Rusche | 432/117 |
| 2,861,356 | 11/1958 | Lellep | 432/117 X |
| 3,168,384 | 2/1965 | Greaves et al. | 34/168 |

*Primary Examiner*—John J. Camby

[57] ABSTRACT
A turntable feeder apparatus is provided for feeding particulate material downwardly from a material storage or ingress position to a material egress position. Typically, a conveyor belt is located immediately beneath the material egress position to convey the particulate material away from that place. The apparatus includes an upwardly facing cone centrally located within an enclosure, and a turntable mounted for rotation independently of the enclosure and there below. The material ingress is in the upper region of the enclosure and the material egress opening is at the centre of the turntable. The upper surface of the turntable is sloped upwardly and inwardly from the central opening therein. When the turntable is turned, a compound sliding action of the material resting on the turntable occurs, and the material is transferred outwardly and downwardly through the egress opening, without the necessity of a hopper bottom.

Air moving equipment maybe added to the turntable feeder apparatus, so that it becomes a turntable feeder and cooler, for cooling such a particulate material as calcined lime. The rate of material flow through the feeder can be adjusted by adjusting the speed of rotation of the turntable, and that adjustment together with an adjustment of the rate of air flow through the enclosure can assure that the temperature of the material exiting from the cooler will be constant.

9 Claims, 4 Drawing Figures

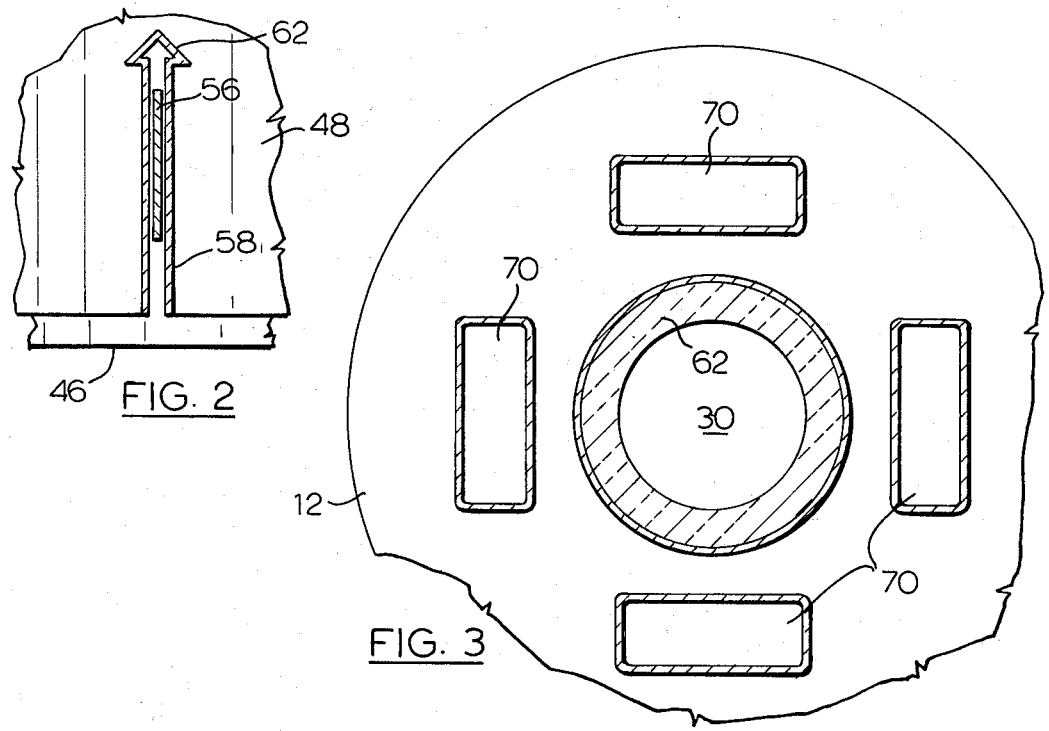
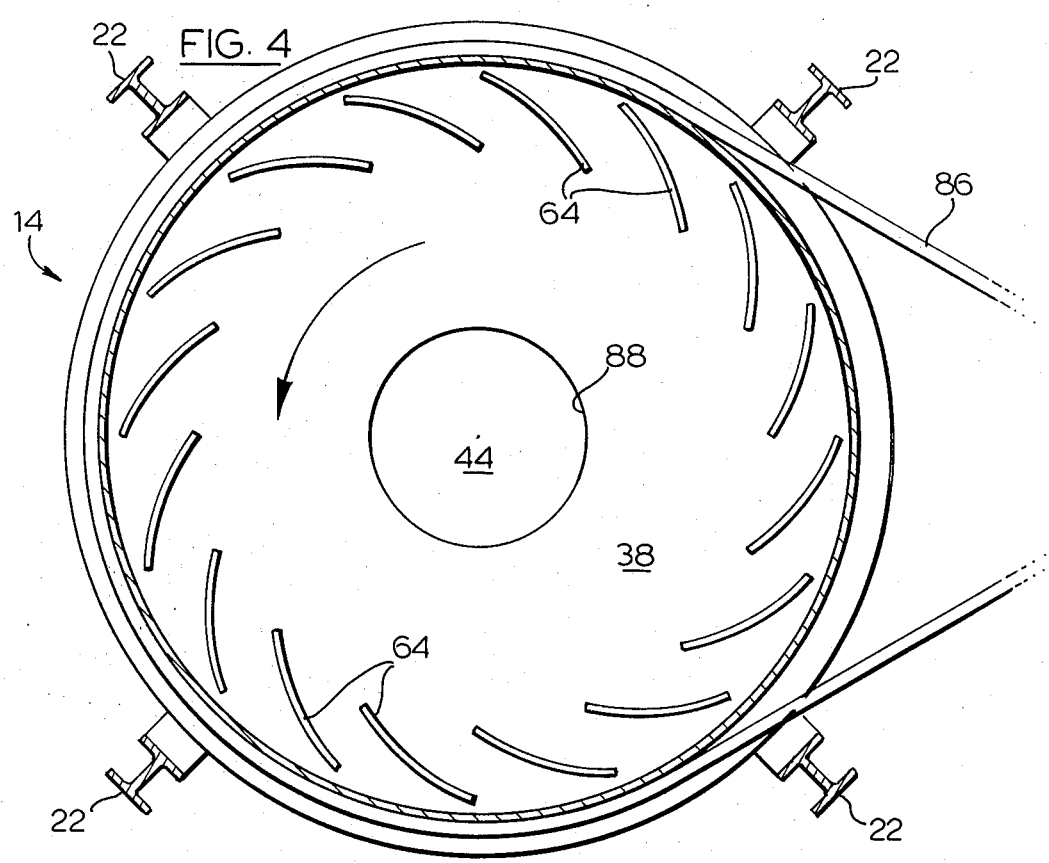

TURNTABLE FEEDER AND COOLER APPARATUS

FIELD OF THE INVENTION

This invention relates to a feeder apparatus for downward feeding of a particulate material. More particularly, the invention relates to a feeder apparatus having a turntable arranged at the bottom of an enclosure, and having a central opening in the turntable through which particulate material may be fed. Air-moving apparatus can be associated with the turntable feeder of this invention to provide forced cooling of the particulate material which is being fed through the feeder apparatus.

BACKGROUND OF THE INVENTION

The feeding of particulate material downwardly from an ingress position or opening to an egress position or opening in a feeder apparatus may be desired where the material is being bulk stored and is to be fed at a certain rate, or in many other circumstances. Further, there may very often be a necessity for feeding material from one place to another and cooling the material while it is being fed. There may be still further circumstances where it is desirable to have bin storage of material with the egress from that bin at the bottom, but where height restrictions preclude the use of a hopper bottom or where use of a hopper bottom would have a marked effect on the storage volume of the bin.

The need for bulk storage of particulate material is very pronounced in certain industries such as the cement and concrete industries where ingredients or aggregates for the manufacture of cement or for making concrete must be stored in great quantities. Further, particularly in the manufacture of cement or the production of calcined products, it is necessary to air cool large quantities of material and to discharge the cooled material at a given temperature and at a known rate. Very often apparatus such as that taught in U.S. Pat. No. 3,274,701 issued Sept. 27, 1966 to Niemitz may be used, where cooling air is forced through the material in a soaking pit or enclosure, by being forced through a plurality of stacked or ganged air passages which are formed by plurality of spaced frusto-conical members. However, material flow from the soaking pit requires that a vibrating or gyrating motion be imparted to the material which rests on a table at the bottom of the soaking pit, and in any event, a hopper bottom must be provided to ensure that the cooled material will slide to an exit beneath the gyrating table.

Other apparatus which is particularly used for cooling of particulate material may require sideways reciprocal displacement and simultaneous rotation of a table element with respect to a hopper or soaking pit, with the contingent requirements for very complicated drive apparatus. In all such prior art cooling devices, it is difficult, if not impossible, to maintain an equal residence time for all of the particles of material within the cooler, so that the feed-through of the material is on a first-in/first-out basis. Another difficulty with the prior art material is that it is difficult to ensure that the flow of air or other cooling medium is uniform throughout all areas of the cooling apparatus.

The present invention provides a feeder apparatus which does not require a hopper bottom, and which therefore has less demands for vertical height to accommodate the feeder apparatus than those of the prior art, particularly such prior art devices as have required hopper bottoms. This is particularly realized because the apparatus of the apparatus of the present invention utilizes a turntable having a central opening therein which forms the egress opening of the apparatus, and where the surface of the turntable is disposed at an angle to the horizontal which is less than the angle of slide of the material being handled; whereas in an apparatus having a hopper bottom, the angle of the hopper must be at least equal to the angle of repose of the material being handled. [The angle of repose of a material is determined particularly by the coefficient of friction of the particles of the material with each other. The angle of slide of the material is determined particularly by the coefficient of friction between particles of the material and the surface on which they rest. If a particulate material such as calcined lime, grain, etc., is resting on a surface such as polished stainless steel, the angle of slide of the material taken with respect to the horizontal is normally a much lower angle than the angle of repose of the material].

Thus, a hopper bottom for any bin or feeder device has greater demands for height than an apparatus according to the present invention having the same width. If material is sitting on a turntable, and the angle of the turntable is less than the angle of slide of the material and the turntable is not moving, then a static situation exists. However, as soon as the turntable begins to move, an unstable condition exists and the material sitting on the turntable tends to move in a direction other than the direction of movement of the turntable. Because of the slope of the surface of the turntable, the movement of the material is generally downwardly, and flow of the material can be established. The rate of flow of the material may be determined by several factors, including the head of the material — i.e., the depth of the material sitting on the table — and the rate of angular displacement or speed of rotation of the turntable. These factors can be easily controlled in apparatus according to the present invention, so that control of the rate of feed of particulate material through such apparatus can be obtained regardless of the rate of feed of material into storage hoppers above such apparatus.

Similarly, the rate of cooling of material by apparatus according to this invention which is equipped with means for effecting air flow through the material, can be adjusted by adjusting the rate of air flow through the material to be cooled — either by changing the speed of flow or the quantity of flow, or both. Close tolerances as to cooling effect, residence time of particles of material during cooling, discharge rate, etc. may therefore be established in accordance with the present invention.

Broadly stated, the feeder apparatus for particulate material according to this invention comprises an enclosure which has a vertical wall — the enclosure generally being circular in cross-section — and having a material inlet situated in the upper region of the enclosure. The material inlet may communicate to hopper storage above the feeder apparatus.

An upwardly facing cone which is closed at its upper end, is situated in the central region of the enclosure so that the apex of the cone is substantially on the central axis of the enclosure; and the upwardly facing cone is supported above the bottom portion of the enclosure so that an annular passageway is formed past the cone from the top region of the enclosure to its bottom portion or region. There may be a sleeve depending downwardly beneath the cone to extend the annular passageway for the material towards the bottom region of the enclosure, depending upon the overall height of the enclosure and the relative height of the cone with respect thereto.

Below the lower end of the sleeve and at the bottom of the enclosure, a turntable is disposed and is mounted for rotation independently of the cone and sleeve and independently of the vertical enclosure wall.

As noted above, the turntable has a central opening therein, and its upper surface is sloped upwardly and outwardly from the central opening to the outer periphery of the turntable.

When the feeder apparatus is intended for use as a cooler for particulate material, further means are provided for effecting an air flow through the enclosure. Air enters the enclosure through the central opening of the turntable; and when the bottom of the enclosure wall is spaced above the turntable and the turntable extends slightly beyond the enclosure wall, air can also be drawn into the enclosure around the periphery of the turntable.

BRIEF SUMMARY OF THE INVENTION

It is an object of this invention to provide a turntable feeder apparatus for feeding particulate material downwardly, which apparatus can be controlled so that the rate of flow of the particulate material can be adjusted.

It is a further object of this invention to provide a feeder apparatus as spoken above, which can also be adapted as a cooler, whereby particulate material fed through the apparatus is cooled by the flow of air through the apparatus in the opposite direction to the flow of material.

It is a feature of this invention that the rate of cooling and the rate of flow of material through apparatus according to this invention may be closely regulated, so that discharge of material from the apparatus at a given temperature and at a given rate can be achieved.

A further object of this invention is to provide a turntable feeder and cooler apparatus which can be easily and inexpensively produced and assembled.

DESCRIPTION OF THE DRAWINGS

These and other features and objects of the invention are more clearly described hereafter, in association with the accompanying drawings, in which:

FIG. 2 is a partial cross-section, drawn to a larger scale than the other figures, taken in the direction of arrows 2—2 of FIG. 1.

FIG. 3 is a partial plan view looking downwardly in the direction of arrows 3—3 of FIG. 1, and FIG. 4 is a plan view looking downwardly in the direction of arrows 4—4 in FIG. 1.

DESCRIPTION OF THE PREFERRED EMBODIMENTS

Figure 1:
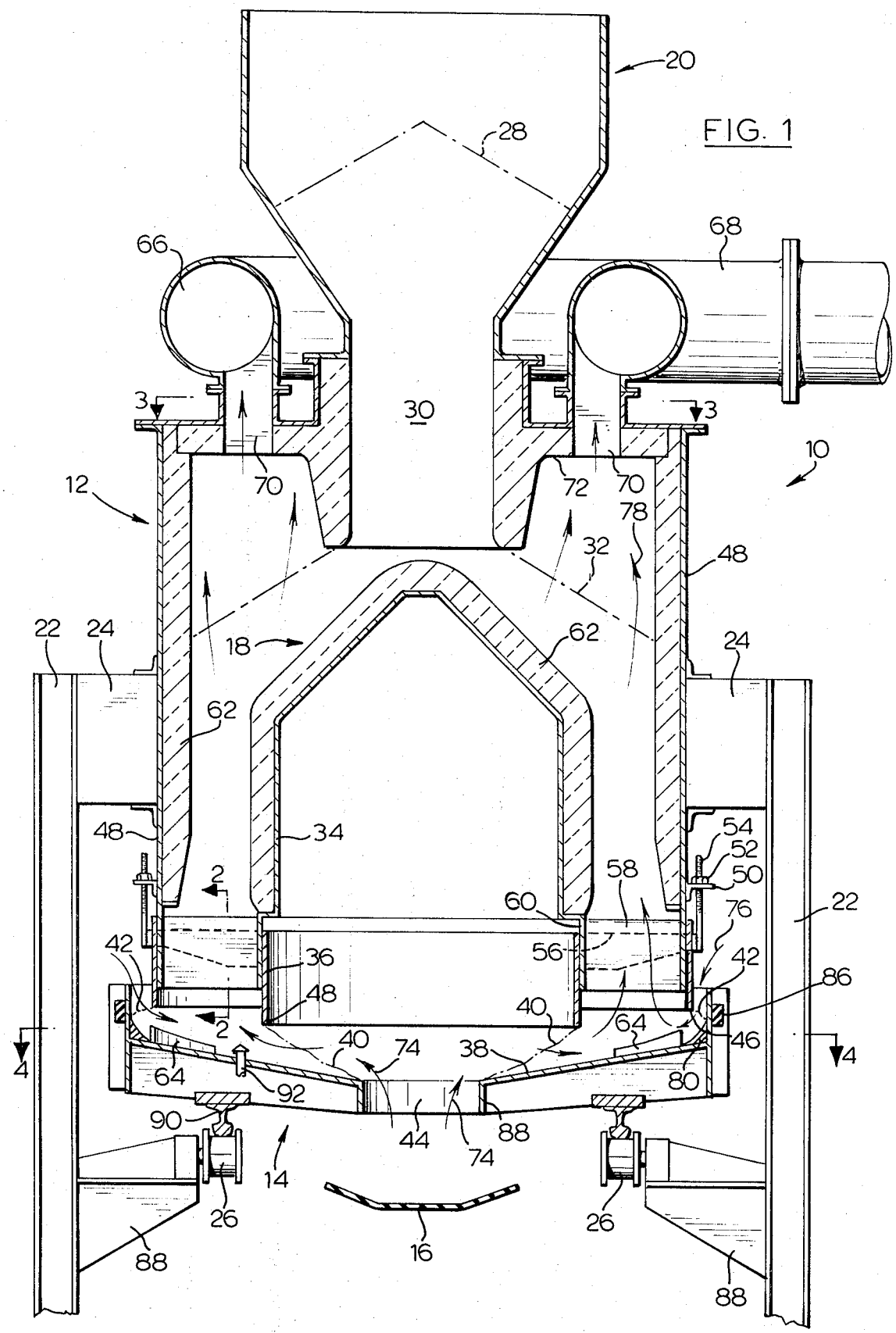
FIG. 1 is a cross-section of an apparatus according to this invention, showing both the turntable feeder arrangement and its arrangement as a cooler.

The apparatus shown in the figures is adaptable for use both as a turntable feeder and as a cooler. The following discussion is made first with regard to operation of the apparatus as a turntable feeder, and then with regard to operation of the apparatus as a feeder/cooler.

FIG. 1 shows an apparatus 10 having an enclosure designated generally at 12 with a turntable 14 at its bottom, a conveyor 16 below the turntable 14, and a hopper 20 above the enclosure 12. An upwardly facing cone 18 which is closed at its upper end, or apex, is centrally located within the enclosure 12. Columns 22 having plates 24 support the enclosure 12. Each column 22 may carry a roller 26 and gusset plate 88 to support the turntable 14 at ring race 90, for rotation independently of the enclosure 12, as discussed in greater detail hereafter.

The hopper 20 may be filled, or if it is not filled the upper surface of the material within the hopper 20 may be such as indicated at 28, or it may be level or otherwise. In any event, the enclosure 12 and the throat 30 extending downwardly from the hopper 20 are assumed to be filled with particulate material to the extent shown. Thus, the upper surface of the material within the enclosure 12 is as shown at 32, and is such that the angle of the upper surface 32 is substantially at the angle of repose of the material, and extends to fill the lower end or mouth of the throat 30. The material surrounds the cone 18, which may have sleeve portions 34 and 36 as discussed in greater detail hereafter; and the material lies on turntable surface 38 of the turntable 14. The angle of the upper surface of the material which lies on the surface 38 of turntable 14 — such as shown at 40 and 42 — is substantially at the angle of repose of the material.

Suitable drive means such as a chain 86 are provided to drive the turntable 14 for rotation as it is supported by the rollers 26; and the chain 86 may, in turn, be driven from a suitable motor/sprocket combination, not shown. Thr turntable 14 has a diameter less than the greatest diameter of cone 18 or of the sleeve portions 24 or 36 which are beneath the cone 18. Thus, the material lying on the upper surface 38 of turntable 14, and having upper surface of repose 40 directed towards the central opening 44, may achieve a non-flowing condition by its own repose when the system is static; without material falling and continuing to flow through the central opening 44. The central opening 44 may have lips 88 formed around its periphery, to direct flow of material downwardly towards belt 16, when a material flow is established. The enclosure 12, turntable 14, cone 18, throat 30 and central opening 44 of turntable 14 are all substantially co-axial.

Assuming a static condition, i.e., that turntable 14 is not rotating and that the enclosure 12 is filled at least up into the throat 30 as discussed above, there is no movement of the material downwardly through the annular passage which extends past the cone 18 and sleeve portions 34 and 36 and over the turntable 14. However, when the turntable 14 begins to rotate, the material lying on its upper surface 38 tends to start to move; and, when the upper surface 38 is highly polished, there is little tendency for the material lying on it to move with the turntable — especially when there is a static head of material at least so as to fill the enclosure 12 as shown in FIG. 1 — but nevertheless an unstable condition begins to exist because of the movement of the turntable. The material therefore moves downwardly across the upper surface 38 of the turntable 14 towards the central opening 44, from which the material falls away from the feeder apparatus. Suitably, a belt conveyor 16 is situated beneath the central opening 44 of turntable 14, to convey material that falls through the opening 44 away from the apparatus as shown in FIG. 1. It will be noted that when the material on the turntable 14 starts to move downwardly as the turntable 14 rotates, such movement occurs entirely around the turntable and entirely around the periphery of the central opening 44 so that an even flow of the material from all around the enclosure 12, and of all of the material on the turntable 14, occurs.

When the apparatus is used for the feeding of particulate material, it can be appreciated that by providing the turntable 14, it is not necessary to have a hopper bottom for the enclosure 12. It can also be appreciated that, when it is desired that the flow should stop, it is merely necessary to stop the rotation of the turntable 14 so as to reassume a static condition with respect to the material lying on the turntable and the material within the enclosure 12. No valves or gates are required, and no heavy or expensive operating and sensing devices are required for such material valves as would be required if a hopper bottom were installed in the enclosure 12.

It will be noted that it is not necessary for the outer periphery of the upper surface 38 of turntable 14 to extend below the bottom 46 of the sidewall 48 of enclosure 12, when the apparatus is being used strictly as a feeder for particulate material. It will also be noted that the rate of flow of material from the feeder apparatus 10 when the turntable 14 is rotating can be affected by the depth of the repose material lying on the upper surface 38 of the turntable 14. Thus, the lower end 48 of the sleeve portion 36 is adapted to be adjustable in height; so that the overall sleeve height may be adjusted, and so that the amount of material lying in a static repose condition between the sleeve portion 36 and lips 88 of opening 44, on surface 38 of turntable 14 may be adjusted. Such adjustment may be accommodated, for example, as illustrated in FIGS. 1 and 2.

Plates 24 at the top of columns 22 are secured to the outer surface of the wall 48, so as to support the wall and the enclosure. Brackets 50 are secured to the outer surface of the enclosure wall 48, and they in turn may have a threaded fitting 52 secured to them and a threaded rod 54 extending through each fitting 52. The bottom end of each of the rods 54 is secured to a collar plate 56, which in turn is secured to the outer surface of the sleeve portion 36. Referring to FIG. 2, it will be seen that there is a collar support 58 which supports a portion 60 of sleeve 34, within which the sleeve portion 36 is fitted; and each of the collar supports 58 may have a cover 62 in the form of an inverted V to preclude entry of material into the channel formed within the collar support 58. Each plate 56 is carried within the channel of one of the collar supports 58, so that adjustment of the threaded fittings 52 with respect to their respective ones of the threaded rods 54 results in an upward or downward movement of the sleeve portion 36. Thus, the height of the lower end 48 of the sleeve portion 36 above the upper surface 38 of turntable 14 may be adjusted.

[It should also be remarked that other arrangements may be made for supporting the cone 18 and sleeve portions 34 and 36 above the turntable 14 than the use of a plurality of collar supports 58 in the form of a spider. For example, a series of roller fittings beneath the sleeves 34 or 36 may be adapted to overlie the upper surface 38 of turntable 14, and the cone 18 and sleeves 34 and 36 may be secured against rotation within the enclosure 12 by suitable stays installed therein].

If the material being handled by the feed apparatus 10 is at an extremely high temperature, such as its entry temperature to the apparatus from a kiln or other device when the apparatus is also being used as a cooler, it may be desirable or necessary to line the interior of the enclosure 12 and the exterior surface of the cone 18 and sleeve 34 with a refractory material 62, such as a castable refractory, block, brick, or other suitable liner. It may also be desired to provide involute blades 64 on the upper surface 38 of the turntable 14, and upstanding therefrom. The involute blades may be higher at their outer end than their inner end from the surface 38, and may have the involute shape as indicated in FIG. 4.

If the head of material overlying the turntable 14 reduces to the point where the friction between the material and the interior surface of wall 48 or the exterior surface of sleeve portion 60 or 36 becomes less than the gross friction effect between the material and upper surface of turntable 38, the entire mass of material lying on the turntable 14 begins to rotate and discharge of the material through the central opening 44 ceases. It will be appreciated that very little material would then be resting upon the turntable 14, relative to the amount of material that would be within the enclosure 12 if it were filled. It can also be appreciated that the attachment of vertical bars or plates to the inside surface of wall 48 and to the outer surface of wall 60 — i.e., the surfaces of walls 48 and 60 which face the repose material on turntable 14 — will have the effect of increasing the net friction between the walls 48 and 60 and the material on the turntable 14, so that even more material will flow downwardly to central opening 44 before the flow stops.

At any time that the turntable 14 is rotating, there may be a tendency for the material lying on it and within the enclosure 12 to move horizontally. Some angular "creep" of the material within the enclosure 12 therefore occurs; and angular creep is, of course, particularly noticeable at very low heads and/or very low rotative speeds of the turntable 14. However, even with high material head — when the enclosure 12 may be substantially filled — there may be a tendency for the material in any one place to try to move downwardly faster than the surrounding material, thereby creating a channel or "rat-hole" within the material. This may occur, for example, where there may be an accumulation of "fines," or dust-like particles. The tendency for angular creep of the material promotes horizontal movement of some material and chokes off any running of material in a "rat-hole"; thereby assuring a "first-in, first-out" flow pattern and substantially uniform residence time of all the material within the enclosure.

It is also evident how the provision of a turntable beneath a bin, where the turntable has a central opening disposed therein and an upper surface which is sloped upwardly and outwardly from the central opening, and where the bin has at least an upwardly facing cone centrally located therein, can preclude the necessity for the hopper bottom and valves or gates. A saving in height, or an increased storage capacity, can be effected thereby.

In the usual circumstances, apparatus such as that shown in FIG. 1 which includes the feeder apparatus as discussed above, is installed as a feeder/cooler for cooling or drying material as it flows through the feeder. Such material may be a calcined material, or other material manufactured or used in the cement or concrete industries or related industries; foodstuff such as manufactured foodstuffs and cereals, grains including wheat, rice etc; and any particulate raw or manufactured material which might be required to be moved downwardly from one place to another, and which might be required to be cooled, dried, or indeed heated by the flow of air or other suitable gas in a gas-solid contact device and heat exchanger.

Thus, apparatus such as that shown in FIG. 1 may include a bustle pipe 66 which communicates to a pipe 68 which, in turn, leads to a fan or other device for exhausting gas upwardly from the enclosure 12. Conveniently, there may be a number of exhaust ports such as those indicated at 70 formed in the upper surface 72 of the enclosure 12, so as to provide gas communication from within the enclosure 12 to the bustle pipe 66. As shown by arrows 74, 76 and 78, there is an air flow effected through the enclosure 12 from the central opening 44 of turntable 14, from around the periphery of turntable 14 through the surface 42 of the material lying on the turntable 14, and upwards through the space in the enclosure 12 above the upper surface 32 of the material to the bustle pipe 66 and thence to the exhaust or take-off pipe 68. Obviously, air drawn into the enclosure 12 from around the periphery of the turntable 14 or through the central opening 44 may be relatively cool or dry with respect to the material within the enclosure 12, and because the flow is omnidirectional through the material, an even cooling or drying effect of the material maybe realized by the heat exchange due to the gas-solid contact which occurs as the air flows. The cooling or drying effect may be controlled by controlling the rate of air flow, or both. Thus, delivery of material at the central opening 44 of turntable 14 at a specified temperature and dryness may be possible. Additional air may be drawn into the enclosure 12 through tubes such as a capped tube 92 which may lead upwardly through the turntable 14, as shown in FIG. 1, if required.

When the apparatus of FIG. 1 is operating as a feeder/cooler apparatus, so that air flow through the material occurs from the central opening 44 of the turntable 14 and from around the periphery of turntable 14, as shown at arrows 74 and 76 respectively, there is a tendency for the flow to fluidize the material. In that event, there may be a slightly greater flow of material from the central opening 44 of turntable 14 than under identical circumstances without the flow of air.

A bead such as that shown at 80 may be formed at the outer periphery of the turntable 14 and on the upper surface 38 thereof, so as to preclude a build-up of repose material at the periphery of the turntable 14.

The movement of the material through the apparatus of this invention is such that the material is generally subjected to a sliding motion such as that which would be found in a chute or trough, and the material is therefore not subjected to harsh treatment or handling. Also, there is no ploughing action against the material, and therefore no tendency of the material particles to break up; neither is there any tendency of the material particles to agglomerate. Because of these circumstances, there is a minimal tendency to dusting of the material. Also, when an air-flow tends to contain any dusting tendency of the material; so that the dust particles flow with the material without creating a dusty environment outside of the enclosure 12, and especially around the conveyor belt 16.

Because the egress of material handled through the enclosure 12 is centrally located, the flow of material from the central opening 44 can be easily handled by conveyors or other material handling system such as the conveyor 16, having a narrow width. The necessity for conveyors to take material out-flow from around the periphery of a table or gyrating plate, is precluded.

If the apparatus is designed to handle a specific material — say, calcined lime — for cooling and feeding of that material, the apparatus can be designed to accommodate the known physical characteristics of that material, particularly its specific gravity, angle of repose, angle of slide, entry temperature and desired output temperature. Thus, the angle of the outer surface of the cone 18 is at least as great as the angle of repose of the material, so that no material tends to reside on the surface of the cone, and so that the compound sliding action of the material through the enclosure 12 is promoted. Also, the angle of the upper surface 38 of the turntable 14 can be established to be less than the angle of slide of the material, so that even when there is sufficient head of material above the turntable, when the turntable is not rotating there is no downward flow of material through the central opening 44. In addition, as noted above, the speed of rotation of the turntable and the rate of air flow through the enclosure can be regulated, and the height of bottom 48 of sleeve 36 above the turntable may also be altered, so as to provide control of the rate of flow and of the amount of cooling of material as it passes downward through the enclosure 12.

If the apparatus of the present invention is intended to feed a number of different products, the angle of the outer surface of the cone 18 is generally established so as to exceed the steepest angle of repose of the material to be handled. In any event, the angle of the outer surface of the cone 18 with respect to the horizontal is greater than the angle of the upper surface 38 of turntable 14, taken with respect to the horizontal.

Because air is drawn into the enclosure 12 around the periphery of the turntable 14, and through the central opening 44 of the turntable 14, there is a maximum utilization of the height requirements for apparatus according to this invention. No additional height is required to accommodate air infeed ducts or other apparatus, and full height availability can be put to material handling purposes. Also, because there is air flow past the turntable 14, there is a greater opportunity for even heat exchange in that vicinity. Thus, the turntable itself may be kept uniformly cool, and the tendency for hot particles or streaks of material to fall on the conveyor 16 is greatly diminished. The risk of damage from hot material landing on the conveyor 16 is thereby minimized.

A turntable feeder apparatus been described, which apparatus provides for a controllable rate of flow of particulate material downwardly from an ingress position to the apparatus through to an egress position of the apparatus, and where the height of the apparatus can be reduced with respect to the height of similar apparatus having a hopper bottom. In addition, it has been shown how apparatus according to the present invention can be used as cooling or drying apparatus for particulate material, where the cooling effect on the material is substantially uniform and the residence time of any particle of the material is substantially the same as that of any other particle of material fed through the apparatus during its operation. Certain alternative arrangements have been suggested, and others will be obvious to a person skilled in the art, but within the spirit and scope of the appended claims.

What I claim is:

1. Apparatus for feeding particulate material downwardly from an inlet to an outlet, comprising:

a circular enclosure having a vertical wall and a material inlet situated in the upper region of said enclosure;

an upwardly facing cone closed at its upper end and centrally located within said enclosure, and supported above the bottom portion thereof so that an annular passageway for said material is formed past said cone from the top region to the bottom portion of said enclosure;

a sleeve depending downwardly beneath said cone;

a turntable below the lower end of said sleeve to form the bottom of said enclosure, said turntable being mounted for rotation independently of said cone and sleeve;

said turntable having a central opening therein, disposed beneath said cone and sleeve; the diameter of said central opening being less than the diameter of said sleeve, and the diameter of said turntable being greater than the diameter of said enclosure;

the upper surface of said turntable being sloped downwardly and inwardly from the outer periphery thereof to the periphery of said central opening; and drive means to driving said turntable for rotation below said cone and sleeve.

2. The apparatus of claim 1 where a portion of said sleeve is elevated so that the vertical height of said sleeve may be adjusted.

3. The apparatus of claim 1, further including a conveyor belt beneath said central opening of said turntable.

4. The apparatus of claim 2 where the angle of the outer surface of said cone with respect to the horizontal is greater than the angle of the upper surface of said turntable with respect to the horizontal.

5. The apparatus of claim 4 where, when the apparatus is intended for use with a specific particulate material, the angle of the outer surface of said cone is at least as great as the angle of repose of said specific particulate material and the angle of the upper surface of said turntable is less than the angle of slide of said material.

6. The apparatus of claim 1, further including a plurality of involute blades upstanding from the upper surface of said turntable.

7. The apparatus of claim 2, further including means for effecting the flow of air upwardly through said central opening in said turntable and under the bottom end of said vertical wall, and thence upwardly through said annular passageway and out from the upper region of said enclosure.

8. The apparatus of claim 7 where a plurality of exhaust ports for the flow of air are formed in an upper surface of said enclosure to provide air communication from within said enclosure to said means for effecting air flow.

9. The apparatus of claim 7 including means for regulating the rate of air flow through said enclosure.

* * * * *